Oct. 30, 1928.
V. BENDIX
1,689,766
METHOD OF MAKING BRAKES
Filed Sept. 15, 1926
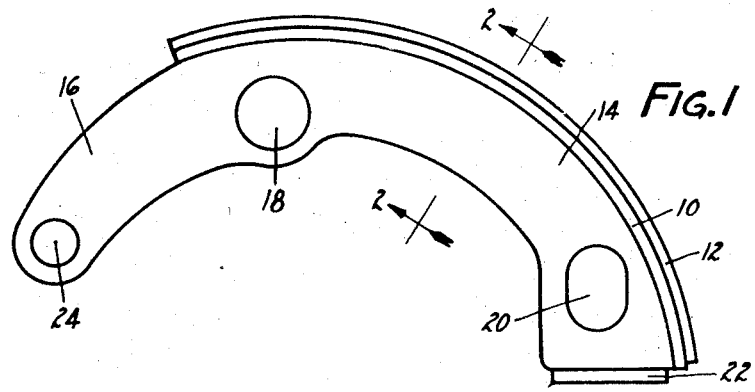
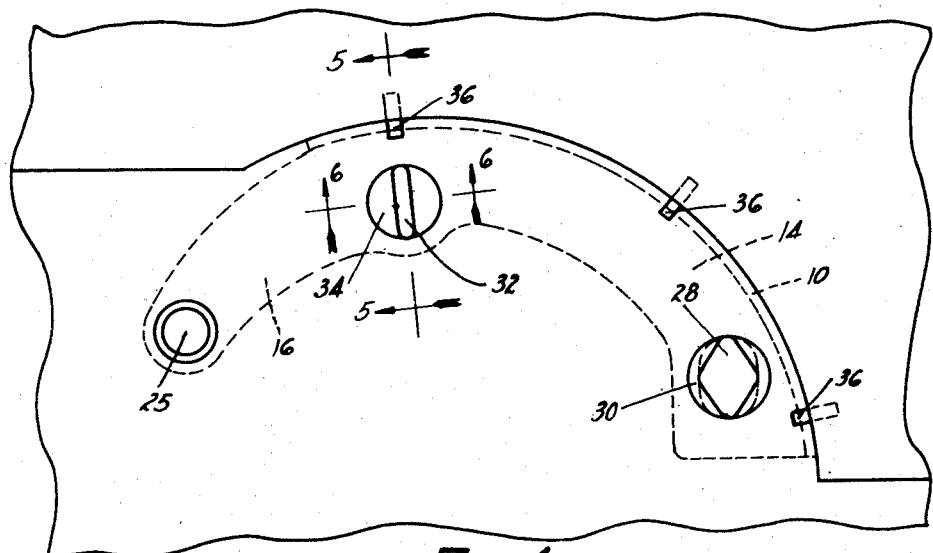
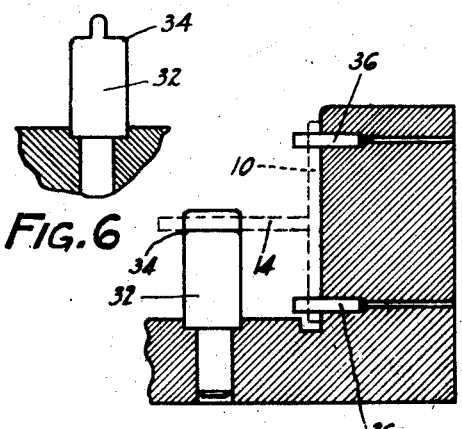
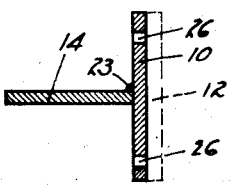
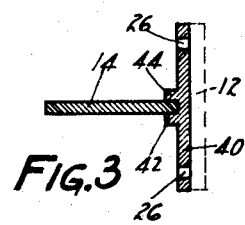
INVENTOR
VINCENT BENDIX
BY
*m. W. McConkey*
ATTORNEY Patented Oct. 30, 1928.

1,689,766

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

METHOD OF MAKING BRAKES.

Application filed September 15, 1926. Serial No. 135,539.

This invention relates to brakes and is hereinafter explained in connection with the manufacture of a shoe for an internal expanding automobile brake. An object of the invention is to make the shoe of two parts accurately positioned with respect to each other and permanently secured together, preferably by arc welding.

The shoe itself is preferably built up of two parts, one of which is a segmental cylindrical band having openings for rivets fastening thereto the usual brake lining, and the other of which is a flat reinforcing or stiffening member which is preferably continued as a pivot arm at one end of the shoe. In one desirable form of the shoe the flat stiffening member is welded or otherwise permanently secured along its outer edge to the inner face of the segmental band to form a unitary shoe body. If desired, the band may be provided with a pair of ribs on its inner face within which the stiffening member fits at its outer edge.

One phase of the invention relates to manufacturing the above-identified shoe in such a manner that the segmental band may be provided initially with openings for the lining rivets, after which the two parts are fastened together in predetermined relation to certain gage portions of the stiffening member, so that the shoe may be jigged by engagement with such portions for insertion of the lining rivets. This eliminates the relatively expensive operation of drilling the shoe after it is finished to receive the lining rivets.

The above and other objects of the invention and features of novelty will be apparent from the following description of the shoe shown in the accompanying drawing as manufactured according to the above-described method. In that drawing:

Figure 1 is a side elevation of the finished shoe;

Figure 2 is a section through the shoe on the line 2—2 of Figure 1 but before the lining is attached;

Figure 3 is a view corresponding to Figure 2 but showing a modification of the shoe;

Figure 4 is a top plan view of the segmental band and stiffening member held in position ready to be welded together;

Figure 5 is a section on the line 5—5 of Figure 4 showing some of the devices for positioning the two parts of the shoe; and Figure 6 is a partial section on the line 6—6 of Figure 4 showing one of the positioning devices.

The novel brake shoe illustrated in Figures 1 and 2 includes a segmental cylindrical band 10 to which is riveted a suitable strip of brake lining 12 and to the inner face of which is welded along its outer edge a flat arcuate stiffening member 14 which is projected beyond one end of the band 10 to form a pivot arm 16 on which the shoe is mounted in the assembled brake. The shoe is intended for use in a brake of the general type shown in Patent No. 1,567,716, granted Bendix Brake Company December 29, 1925, on an application of A. Y. Dodge. For cooperation with certain parts shown in that patent, the stiffening member 16 is provided with round openings 18 and 24, and an elongated opening 20. The finished shoe is provided with a wear plate 22 at its end for engagement with a brake-applying cam.

According to an important feature of the invention, the two parts 10 and 14 are permanently secured together by welding the stiffening member 14 along its outer edge to the inner face of the band 10 approximately at its center, as for example by an arc weld 23.

In making the shoe the parts 10 and 14 are previously formed as blanks with the openings 18, 20 and 24, in the member 14, the band 10 being formed with the openings 26 for the rivets which hold the lining 12. During the welding, the stiffening member 14 is held by a positioning device 28 engaging at four spaced points the sides of the opening 20 and having a base 30 engaging and supporting the lower face of the stiffening member 14. This member is also positioned by a gage device 32 engaging opposite sides of the opening 18 and which may also have a shouldered base 34 engaging and supporting the lower surface of the stiffening member 14. A shouldered gage pin 25 also supports member 14 at the pivot opening 24. The segmental band 10 is positioned in predetermined relation to the stiffening part 14 during the welding by a plurality of pins 36 engaging the rivet openings 26 and which position the band and at the same time support it. While the parts are held as described above, they are permanently fastened together by arc welding.

The modified shoe shown in Figure 3 differs from that shown in Figure 2 in that the outer band 40 corresponding to the band 10 is rolled to provide on its inner face space ribs 42 and 44 between which the stiffening member 14 fits at its outer edge.

While two particular shoes have been described in detail, and the method of manufacturing them has been fully explained, it is not my intention to limit the scope of the invention to those particular shoes or to that exact modification or otherwise than by the terms of the appended claims.

I claim:

1. That method of making brake shoes which comprises forming a segmental cylindrically-arcuate band with openings for lining rivets, forming a flat arcuate stiffening member with gage portions, positioning the band with respect to the stiffening member by gage devices engaging the rivet openings and said portions, and holding the band and stiffening member so positioned and securing them permanently together while so held.

2. That method of making brake shoes which comprises forming a segmental cylindrically-arcuate band with openings for lining rivets, forming a flat arcuate stiffening member with transverse gage openings, positioning the band with respect to the stiffening member by gage devices engaging the rivet openings and said transverse openings, and holding the band and stiffening member so positioned and welding them permanently together while so held.

In testimony whereof, I have hereunto signed my name.

VINCENT BENDIX.